(12) United States Patent
Wang et al.

(10) Patent No.: US 7,585,590 B2
(45) Date of Patent: Sep. 8, 2009

(54) RECHARGEABLE LITHIUM-ION CELL WITH TRIPHENYLAMINE REDOX SHUTTLE

(75) Inventors: Richard L. Wang, Halifax (CA); Claudia Buhrmester, Darmstadt (DE); William M. Lamanna, Stillwater, MN (US); Jeffrey R. Dahn, Upper Tantallon (CA); Lee Moshurchak, Halifax (CA)

(73) Assignee: 3M Innovative Properties Company, St. Paul, MN (US)

( * ) Notice: Subject to any disclaimer, the term of this patent is extended or adjusted under 35 U.S.C. 154(b) by 240 days.

(21) Appl. No.: 11/671,128

(22) Filed: Feb. 5, 2007

(65) Prior Publication Data

US 2007/0196727 A1 Aug. 23, 2007

Related U.S. Application Data

(60) Provisional application No. 60/743,314, filed on Feb. 17, 2006.

(51) Int. Cl.
*H01M 6/04* (2006.01)
(52) U.S. Cl. .................. 429/199; 429/200; 429/327; 429/330; 429/331; 429/332; 429/336; 429/339; 429/231.1; 429/231.95; 429/231.8; 429/231.4; 429/328; 429/224; 429/231.5
(58) Field of Classification Search .................. 429/328, 429/327, 326, 199, 330, 332, 336, 338, 231.1, 429/231.95, 231.8, 231.4, 200, 331, 339, 429/224, 231.5
See application file for complete search history.

(56) References Cited

U.S. PATENT DOCUMENTS

| 4,670,363 | A | 6/1987 | Whitney et al. |
|---|---|---|---|
| 5,506,068 | A | 4/1996 | Dan et al. |
| 5,759,714 | A | 6/1998 | Matsufuji et al. |
| 5,976,731 | A | 11/1999 | Negoro et al. |
| 6,004,698 | A | 12/1999 | Richardson et al. |
| 6,232,021 | B1 * | 5/2001 | Negoro ............ 429/328 |
| 7,294,436 | B2 | 11/2007 | Abe et al. |
| 2001/0004507 | A1 | 6/2001 | Gan et al. |
| 2005/0042519 | A1 | 2/2005 | Roh et al. |
| 2008/0050658 | A1 | 2/2008 | Abe et al. |

FOREIGN PATENT DOCUMENTS

| JP | 61-279061 | 12/1986 |
|---|---|---|
| JP | 62-082649 | 4/1987 |
| JP | 63-055861 | 3/1988 |
| JP | 63-055868 | 3/1988 |
| JP | 05-036439 | 2/1993 |
| JP | 63-38347 | 6/1994 |
| JP | 07-302614 | 11/1995 |
| JP | 08236155 A | 9/1996 |

OTHER PUBLICATIONS

Walter, "Triarylaminium Salt Free Radicals", *J. Am. Chem. Soc.*, vol. 77 (1955), pp. 5999-6002.
Burdon et al., "Aromatic Polyfluoro-compounds. Part XIX.[1] The Preparation of Some Polyfluorodi- and Polyfluorotri-phenylamines." *J. Chem. Soc.* (1964), pp. 5017-5021.
Schmidt et al., "Elektrochemische und spektroskopische Untersuchung bromsubstituierter Triarylamin-Redoxsysteme", *Chem. Ber.* 113 (1980), pp. 577-585.
Lee et al., "Development of the Colle-Salvetti correlation-energy formula into a functional of the electron density", *Physical Review B*, vol. 37, No. 2, Jan. 1988, pp. 785-789.
Colbow et al., "Structure and Electrochemistry of the Spinel Oxides $LiTi_2O_4$ and $Li_{4/3}Ti_{5/3}O_4$", *J. of Power Sources* 26 (1989), pp. 397-402.
Dapperheld et al., "Substituted Triarylamine Cation-Radical Redox Systems—Synthesis, Electrochemical and Spectroscopic Properties, Hammet Behavior, and Suitability as Redox Catalysts", *Chem. Ber.* 124 (1991), pp. 2557-2567.
Becke, "Density-functional thermochemistry. III. The role of exact exchange", *J. Chem. Phys.* 98 (7), Apr. 1993, pp. 5648-5652.
Miller et al., "Reactions of polyfluoroarenes with hexamethyldisilazane and with 1,1,1-trimethyl-N,N-bis(trimethylsilyl) stannaneamine in the presence of caesium fluoride", *J. of Fluorine Chemistry* 75 (1975), pp. 169-172.
Wilson et al., "Lithium Insertion in Carbons Containing Nanodispersed Silicon", *J. Electrochem. Soc.*, vol. 142, No. 2, Feb. 1995, pp. 326-332.
Richardson et al., "Overcharge Protection for Rechargeable Lithium Polymer Electrolyte Batteries", *J. Electrochem. Soc.*, vol. 143, No. 12, Dec. 1996, pp. 3992-3996.
Buhrmester et al., "Studies of Aromatic Redox Shuttle Additives for LiFePO4-Based Li-Ion Cells", *J. Electrochem. Soc.*, 152 (2), pp. A2390, (2005).
Wang et al., "Calculations of Oxidation Potentials of Redox Shuttle Additives for Li-Ion Cells", *J. of Electrochem. Soc.* 153 (2), pp. A445-A449, (2006).

* cited by examiner

*Primary Examiner*—Laura S Weiner
(74) *Attorney, Agent, or Firm*—Stephen F. Wolf

(57) ABSTRACT

Provided is a rechargeable lithium-ion cell that contains a positive electrode, a negative electrode, a charge-carrying electrolyte containing a charge carrying medium and a lithium salt, and a triphenylamine compound dissolved in or dissolvable in the electrolyte. The triphenylamine compound has an oxidation potential above the positive electrode recharged potential and serves as a cyclable redox chemical shuttle providing cell overcharge protection. Also provided are methods for manufacturing a rechargeable lithium-ion cell.

17 Claims, 1 Drawing Sheet

RECHARGEABLE LITHIUM-ION CELL WITH TRIPHENYLAMINE REDOX SHUTTLE

CROSS REFERENCE TO RELATED APPLICATION

This application claims the benefit of U.S. Provisional Patent Application No. 60/743,314 filed Feb. 17, 2006, the disclosure of which is incorporated by reference herein in its entirety.

FIELD OF THE INVENTION

This invention relates to overcharge protection in rechargeable lithium-ion cells.

BACKGROUND

When properly designed and constructed, rechargeable lithium-ion cells can exhibit excellent charge-discharge cycle life, little or no memory effect, and high specific and volumetric energy. However, lithium-ion cells do have some shortcomings, including an inability to tolerate recharging to potentials above the manufacturer's recommended end of charge potential without degradation in cycle life; the danger of overheating, fire or explosion for cells recharged to potentials above the recommended end of charge potential; and difficulties in making large cells having sufficient tolerance to electrical and mechanical abuse for consumer applications. Single and connected (e.g., series-connected) lithium-ion cells typically incorporate charge control electronics to prevent individual cells from exceeding the recommended end of charge potential. This circuitry adds cost and complexity and has discouraged the use of lithium ion cells and batteries in low-cost mass market electrical and electronic devices such as flashlights, music players, and the like. Instead, these low-cost devices typically are powered by non-rechargeable batteries such as alkaline cells.

SUMMARY

Various chemical moieties have been proposed for imparting overcharge protection to rechargeable lithium-ion cells. Chemical moieties designated as "redox shuttles" or "shuttles" can provide an oxidizable and reducible charge-transporting species that may repeatedly transport charge between the negative and positive electrodes once the charging potential reaches a desired value. In contrast, materials that function as fuses or shunts to provide one-time or limited-time cell overcharge protection also have been proposed.

The invention provides in one aspect a rechargeable lithium-ion cell comprising (a) positive electrode having a recharged potential; (b) a negative electrode; (c) a charge-carrying electrolyte comprising a charge carrying medium and a lithium salt; and (d) a cyclable redox chemical shuttle comprising a fluorine-containing or chlorine-containing triphenylamine compound or a triphenylamine compound with a molecular weight greater than 500; wherein the chemical shuttle is dissolved in or dissolvable in the electrolyte and has an oxidation potential above the recharged potential of the positive electrode.

The invention provides in another aspect a rechargeable lithium-ion cell comprising (a) a positive electrode having a recharged potential; (b) a negative electrode comprising graphitic carbon, lithium metal or a lithium alloy compound; and (c) a charge-carrying electrolyte comprising (i) a charge-carrying media comprising ethylene carbonate, propylene carbonate, dimethyl carbonate, diethyl carbonate, ethylmethyl carbonate, vinylene carbonate, vinylethylene carbonate, fluoroethylene carbonate or combination thereof; (ii) a lithium salt comprising $LiPF_6$, lithium bis(oxalato)borate, $LiN(SO_2CF_3)_2$, $LiN(SO_2C_2F_5)_2$, $LiC(SO_2CF_3)_3$, or combination thereof, and (iii) a cyclable redox chemical shuttle comprising a triphenylamine compound; wherein the positive electrode comprises $LiFePO_4$, $Li_2FeSiO_4$, $LiMn_2O_4$, $LiMnPO_4$, $Li_xMnO_2$ (where x is about 0.3 to about 0.4), $MnO_2$, $LiVOPO_4$, $Li_3V_2(PO_4)_3$, $LiV_3O_8$, or $LiVO(PO_4)F$; and wherein the chemical shuttle is dissolved in or dissolvable in the electrolyte and has an oxidation potential above the recharged potential of the positive electrode.

In another aspect, the present invention provides a method for manufacturing a rechargeable lithium-ion sealed cell comprising the steps of assembling in any order and enclosing in a suitable case (a) a positive electrode having a recharged potential; (b) a negative electrode; (c) a charge-carrying electrolyte comprising charge carrying medium and lithium salt; and (d) a cyclable redox chemical shuttle comprising a fluorine-containing triphenylamine compound or a triphenylamine compound with a molecular weight greater than 500; wherein the chemical shuttle is dissolved in or dissolvable in the electrolyte and has an oxidation potential above the recharged potential of the positive electrode and has an oxidation potential above the recharged potential of the positive electrode.

The invention provides in yet another aspect a method for recharging a lithium-ion cell while chemically limiting cell damage due to overcharging comprising supplying charging current across a positive electrode and a negative electrode of a lithium-ion rechargeable cell containing a charge-carrying electrolyte. The charge-carrying electrolyte comprises a charge carrying medium, a lithium salt, and a cyclable redox chemical shuttle comprising one or more triphenylamine compounds, or mixtures thereof dissolved in the electrolyte, and wherein the electrolyte has an oxidation potential above the recharged potential of the positive electrode.

These and other aspects of the invention will be apparent from the detailed description below. In no event, however, should the above summaries be construed as limitations on the claimed subject matter, which subject matter is defined solely by the attached claims, as may be amended during prosecution.

DETAILED DESCRIPTION

Figure 1:
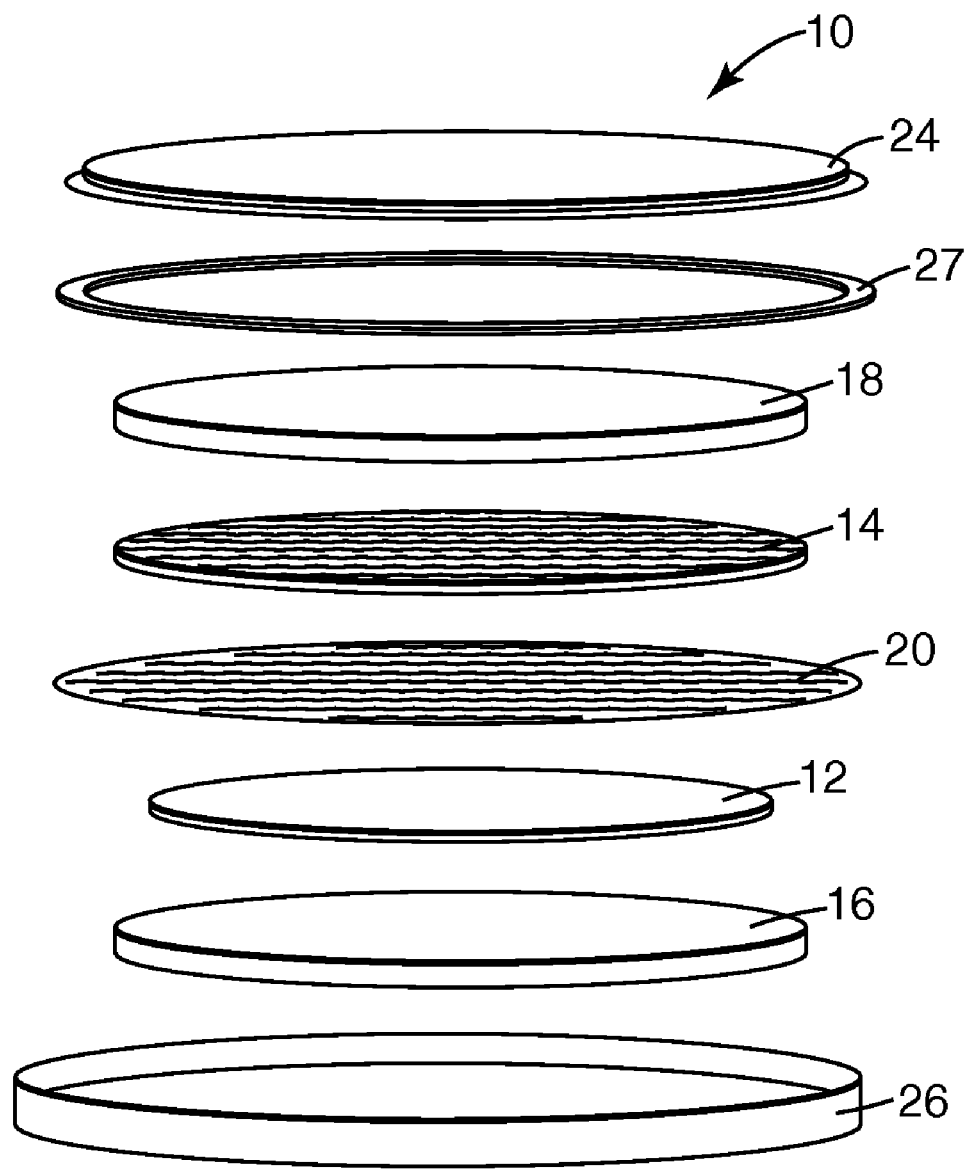
FIG. 1. is an exploded perspective schematic view of an electrochemical cell.

The phrase "positive electrode" refers to one of a pair of rechargeable lithium-ion cell electrodes that under normal circumstances and when the cell is fully charged will have the highest potential. We retain this terminology to refer to the same physical electrode under all cell operating conditions even if such electrode temporarily (e.g., due to cell overdischarge) is driven to or exhibits a potential below that of the other (the negative) electrode.

The phrase "negative electrode" refers to one of a pair of rechargeable lithium-ion cell electrodes that under normal circumstances and when the cell is fully charged will have the lowest potential. This terminology herein refers to the same physical electrode under all cell operating conditions even if such electrode is temporarily (e.g, due to cell overdischarge) driven to or exhibits a potential above that of the other (the positive) electrode.

The phrase "redox chemical shuttle" refers to an electrochemically reversible moiety that during charging of a lithium-ion cell can become oxidized at the positive electrode, migrate to the negative electrode, become reduced at the negative electrode to reform the unoxidized (or less-oxidized) shuttle species, and migrate back to the positive electrode.

When used with respect to a positive electrode, the phrase "recharged potential" refers to a value $E_{cp}$ (in volts) measured relative to Li/Li$^+$ by constructing a cell containing the positive electrode, a lithium metal negative electrode and an electrolyte containing no redox chemical shuttle, carrying out a charge/discharge cycling test and observing the potential at which the positive electrode becomes delithiated during the first charge cycle to a lithium level corresponding to at least 90% of the available recharged cell capacity. For some positive electrodes (e.g., LiFePO$_4$), this lithium level may correspond to approximately complete delithiation (e.g., to Li$_0$FePO$_4$). For other positive electrodes (e.g., some electrodes having a layered lithium-containing structure), this lithium level may correspond to partial delithiation.

The word "cyclable" when used in connection with a redox chemical shuttle refers to a material that when exposed to a charging voltage sufficient to oxidize the material (e.g., from a neutral to a cationic form, or from a less-oxidized state to a more oxidized state) and at an overcharge charge flow equivalent to 100% of the cell capacity will provide at least two cycles of overcharge protection for a cell containing the chosen positive electrode.

The term "phase" refers to a homogeneous liquid portion that is present or that can form in a liquid system. The term "phases" refers to the presence of more than one phase in a heterogeneous liquid system. When used with respect to a mixture of a redox chemical shuttle and electrolyte, the terms "dissolved" and "dissolvable" refer to a shuttle that when present in or added to the electrolyte forms or will form a solution containing a mobile charge-carrying moiety in an amount sufficient to provide overcharge protection at a charging current rate sufficient to charge fully in 20 hours or less a lithium-ion cell containing the chosen positive electrode, negative electrode, and electrolyte.

When used with respect to a redox chemical shuttle, the phrase "oxidation potential" refers to a value $E_{cv}$ (in volts). $E_{cv}$ may be measured by dissolving the shuttle in the chosen electrolyte, measuring current flow versus voltage using cyclic voltammetry and a platinum or glassy carbon working electrode, a copper counter electrode and a non-aqueous Ag/AgCl reference electrode that has been previously referenced to Li/Li$^+$ and determining the potentials $V_{up}$ (viz., during a scan to more positive potentials) and $V_{down}$ (viz., during a scan to more negative potentials), relative to Li/Li$^+$, at which peak current flow is observed. $E_{cv}$ will be the average of $V_{up}$ and $V_{down}$. Shuttle oxidation potentials may be closely estimated (to provide a value "$E_{obs}$") by constructing a cell containing the shuttle, carrying out a charge/discharge cycling test, and observing during a charging sequence the potential at which a voltage plateau indicative of shuttle oxidation and reduction occurs. The observed result may be corrected by the amount of the negative electrode potential versus Li/Li$^+$ to provide an $E_{obs}$ value relative to Li/Li$^+$. Shuttle oxidation potentials may be approximated (to provide a value "$E_{calc}$") using modeling software such as GAUSSIAN 03 from Gaussian, Inc. to predict oxidation potentials (e.g., for compounds whose $E_{cv}$ is not known) by correlating model ionization potentials to the oxidation and reduction potentials and lithium-ion cell behavior of measured compounds.

The present inventors noted that polyanilines have been used in positive electrodes of lithium ion batteries, and that nitrogen-containing organic compounds, including aromatic compounds, have been added to the electrolytes of some types of lithium ion batteries to decrease the charge/discharge capacity loss upon repeated cycling. However, these compounds only work in cells containing specific electrodes or in combination with other electrolyte additives to provide protection to the cells from overdischarge. The present inventors discovered materials that provide improved safety and cell performance during repeated charge/discharge cycles.

A variety of positive electrodes may be employed in the disclosed lithium-ion cells. Some positive electrodes may be used with a wide range of triphenylamine compounds, whereas other positive electrode materials having relatively high recharged potentials may be usable only with a smaller range of triphenylamine compounds having suitably higher oxidation potentials. Representative positive electrodes and their approximate recharged potentials include LiCoO$_2$ (4.4V versus (vs.) Li/Li$^+$), FeS$_2$ (3.0 V vs. Li/Li$^+$), LiCoPO$_4$ (4.8 V vs. Li/Li$^+$), LiFePO$_4$ (3.45 V vs. Li/Li$^+$), Li$_2$FeS$_2$ (3.0 V vs. Li/Li$^+$), Li$_2$FeSiO$_4$ (2.9 V vs. Li/Li$^+$), LiMn$_2$O$_4$ (4.1 V vs. Li/Li$^+$), LiMnPO$_4$ (4.1 V vs. Li/Li$^+$), LiNiPO$_4$ (5.1 V vs. Li/Li$^+$), LiV$_3$O$_8$ (3.7 V vs. Li/Li$^+$), LiV$_6$O$_{13}$ (3.0 V vs. Li/Li$^+$), LiVOPO$_4$ (4.15 V vs. Li/Li$^+$), LiVOPO$_4$F (4.3 V vs. Li/Li$^+$), Li$_3$V$_2$(PO$_4$)$_3$ (4.1 V (2 Li) or 4.6 V (3 Li) vs. Li/Li$^+$), MnO$_2$ (3.4 V vs. Li/Li$^+$), MoS$_3$ (2.5 V vs. Li/Li$^+$), sulfur (2.4 V vs. Li/Li$^+$), TiS$_2$ (2.5 V vs. Li/Li$^+$), TiS$_3$ (2.5 V vs. Li/Li$^+$), V$_2$O$_5$ (3.6 V vs. Li/Li$^+$), V$_6$O$_{13}$ (3.0 V vs. Li/Li$^+$), and combinations thereof. Other useful positive electrodes include lithium mixed metal oxide electrodes such as those described in U.S. Pat. Nos. 5,858,324, 5,900,385, and 6,964,828. Powdered lithium (e.g., LECTRO™ MAX stabilized lithium metal powder, from FMC Corp., Gastonia, N.C.) may be included in the positive electrode as formed. Lithium may also be incorporated into the negative electrode so that extractible lithium will be available for incorporation into the positive electrode during initial discharging. Some positive electrode materials may, depending upon their structure or composition, be charged at a number of voltages, and thus may be used as a positive electrode if an appropriate form and appropriate cell operating conditions are chosen. Electrodes made from, for example, LiFePO$_4$, Li$_2$FeSiO$_4$, Li$_x$MnO$_2$ (where x is about 0.3 to about 0.4, and made for example by heating a stoichiometric mixture of electrolytic manganese dioxide and LiOH to about 300 to about 400° C.), or MnO$_2$ (made for example by heat treatment of electrolytic manganese dioxide to about 350° C.) can provide cells having desirable performance characteristics when used with triphenylamine compounds of the present invention having oxidation potentials of about 3.6 to about 4.0 V relative to Li/Li$^+$. Electrodes made from LiMn$_2$O$_4$, LiMnPO$_4$, LiVOPO$_4$, and Li$_2$V2(PO$_4$)$_3$, can provide cells having desirable performance characteristics when used with triphenylamine compounds having oxidation potentials of about 4.3 to about 4.6V relative to Li/Li$^+$. The positive electrode may contain additives as will be familiar to those skilled in the art, e.g., carbon black, flake graphite, and the like. As will be appreciated by those skilled in the art, the positive electrode may be in any convenient form including foils, plates, rods, pastes, or as a composite made by forming a coating of the positive electrode material on a conductive current collector or other suitable support.

A variety of negative electrodes may be employed in the disclosed lithium-ion cells. Representative negative electrodes include graphitic carbons e.g., those having a spacing between (002) crystallographic planes, $d_{002}$, of 3.45 Å>$d_{002}$>3.354 Å and existing in forms such as powders, flakes, fibers, or spheres (e.g., mesocarbon microbeads); lithium metal; $Li_{4/3}Ti_{5/3}O_4$; the lithium alloy compounds described in U.S. Pat. Nos. 6,203,944 (Turner et al.) and 6,255,017 (Turner); U.S. Patent Application Publ. Nos. 2007/0020528 A1, 2007/0020521 A1, and 2007/0020522 A1 (all Obrovac et al.); U.S. Patent Publ. No. 2007/0148544 A1 (Le); Sn—Co-based nanostructured negative electrodes (e.g., the negative electrode in the NEXELION hybrid lithium-ion battery from Sony Cow.); and combinations thereof. The lithium alloy compounds include combinations of lithium with active metals such as Ag, Au, Mg, Zn, Cd, Hg, Al, Ga, In, Tl, Ge, Sn, Pb, C, Si, Sb, and Bi. They may include amorphous mixtures or combinations of mixtures of lithium and active metals with other inactive materials and they may have more than one phase. A negative electrode containing extractable lithium (e.g., a lithium metal electrode, extractable lithium alloy electrode, or electrode containing powdered lithium) may be employed so that extractable lithium will be incorporated into the positive electrode during initial discharging. The negative electrode may contain additives as will be familiar to those skilled in the art, e.g., conductive diluents and binders. As will be appreciated by those skilled in the art, the negative electrode may be in any convenient form including foils, plates, rods, pastes or as a composite made by forming a coating of the negative electrode material on a conductive current collector or other suitable support.

The electrolyte provides a charge-carrying pathway between the positive and negative electrodes, and initially contains at least the charge carrying media and the lithium salt. The electrolyte may include other additives that will be familiar to those skilled in the art. As will be appreciated by those skilled in the art, the electrolyte may be in any convenient form including liquids and gels.

A variety of charge carrying media may be employed in the electrolyte. Exemplary media are liquids or gels capable of solubilizing sufficient quantities of lithium salt and redox chemical shuttle so that a suitable quantity of charge can be transported from the positive electrode to negative electrode. Exemplary charge carrying media can be used over a wide temperature range, e.g., from about −30° C. to about 80° C. without freezing or boiling, and are stable in the electrochemical window within which the cell electrodes and shuttle operate. Representative charge carrying media include ethylene carbonate, propylene carbonate, dimethyl carbonate, diethyl carbonate, ethylmethyl carbonate, butylene carbonate, vinylene carbonate, fluoroethylene carbonate, vinylethylene carbonate, fluoropropylene carbonate, γ-butyrolactone, methyl difluoroacetate, ethyl difluoroacetate, dimethoxyethane, diglyme (bis(2-methoxyethyl)ether), and combinations thereof.

A variety of lithium salts may be employed in the electrolyte. Exemplary lithium salts are stable and soluble in the chosen charge-carrying media and perform well in the chosen lithium-ion cell, and include $LiPF_6$, $LiBF_4$, $LiClO_4$, lithium bis(oxalato)borate ("LiBOB"), $LiN(SO_2CF_3)_2$, $LiN(SO_2C_2F_5)_2$, $LiAsF_6$, $LiC(SO_2CF_3)_3$, and combinations thereof.

The electrolyte also conveniently contains the dissolved redox chemical shuttle. The electrolyte also can be formulated without dissolved redox chemical shuttle, and incorporated into a cell whose positive or negative electrode contains dissolvable redox chemical shuttle that can dissolve into the electrolyte after cell assembly or during the first charge-discharge cycle, so that the electrolyte will contain dissolved redox chemical shuttle once the cell has been put into use.

A variety of unsubstituted or substituted triphenylamine compounds may be employed in the disclosed lithium-ion cells. When an attempt is made to charge the cell above the shuttle compound oxidation potential, the oxidized shuttle molecules carry a charge quantity corresponding to the applied charging current to the negative electrode, thus preventing cell overcharge. Especially preferred shuttle materials are sufficiently cyclable to provide at least 10, at least 15, at least 25, at least 40, at least 50, or even more cycles of overcharge protection at a charging voltage sufficient to oxidize the material and at an overcharge charge flow equivalent to 100% of the cell capacity during each cycle. The triphenylamine compounds are different from the positive electrode and have an oxidation potential different from and higher (viz., more positive) than the positive electrode recharged potential. The triphenylamine compound oxidation potential desirably is just slightly higher than the positive electrode recharged potential, below the potential at which irreversible cell damage might occur, and desirably below the potential at which excessive cell heating or outgassing might occur. As a general numeric guide for typical lithium-ion cell constructions, the triphenylamine compound may, for example, have an oxidation potential from about 0.1 V to about 2.0 V above the positive electrode recharged potential; from about 0.2 to about 1.0 V above the positive electrode recharged potential; or from about 0.3 to about 0.6 V above the positive electrode recharged potential. For example, $LiCoO_2$ positive electrodes have a recharged potential of about 4.4 V vs. $Li/Li^+$. Exemplary triphenylamine compounds for use with such electrodes should have an oxidation potential of about 4.6 to about 5.4 V vs. $Li/Li^+$. $LiFePO_4$ positive electrodes have a recharged potential of about 3.45 V vs. $Li/Li^+$, and exemplary triphenylamine compounds for use with such electrodes desirably have an oxidation potential of about 3.6 to about 4.5 V vs. $Li/Li^+$. $Li_2FeSiO_4$ positive electrodes have a recharged potential of around 2.8 V vs. $Li/Li^+$, and exemplary triphenylamine compounds for use with such electrodes desirably have an oxidation potential of about 3.0 to about 3.8 V vs. $Li/Li^+$. $Li_xMnO_2$ (where x is about 0.3 to 0.4) and $MnO_2$ positive electrodes have a recharged potential of about 3.4V vs. $Li/Li^+$, and exemplary triphenylamine compounds for use with such electrodes desirably have an oxidation potential of about 3.7 to about 4.4 V vs. $Li/Li^+$.

The triphenylamine compounds of this invention may be substituted or unsubstituted. Substituted triphenylamine compounds of this invention may contain at least one halo, haloalkyl, alkyl, alkoxy, or dialkylamido substituent on at least one of the aromatic rings. The halo substituents may be fluoro, bromo, or chloro. Each aromatic ring may be substituted with an equal number of the same halogen. The haloalkyl substituents may have from 1 to 4 carbon atoms and are highly substituted with halogen. By highly substituted it is meant that more than 50% of the available hydrogen atoms of each alkyl group may substituted with halogen. Examples of haloalkylsubstituents useful in this invention include perhaloalkyl groups (such as trihalomethyl, pentahaloethyl, heptahalopropyl, etc.) and highly halogenated alkyl substituents such as dihalomethyl, trihaloethyl, pentahalopropyl, etc). Alkyl substituents may include methyl, ethyl, n-propyl, iso-propyl, n-butyl, sec-butyl, iso-butyl, and tert-butyl groups. Alkoxy substituents may include methoxy, ethoxy, n-propoxy, iso-propoxy, n-butoxy, sec-butoxy, iso-butoxy, and tert-butoxy groups. Dialkylamido substituents may include $Me_2N$— and $Et_2N$— groups. The aromatic ring of the triphenylamine compounds may be independently substituted with from one to five halo or haloalkyl substitutents. The substituents may be the same halo or haloalkyl substituent or a mixture of different halo or haloalkyl substituents on each ring. In addition all of the substituents may be on one or two rings with the other ring(s) remaining unsubstituted. Any combination of substitution of halo or haloalkyl on any positions of the three aromatic rings of the triphenylamine compound are possible. Any two aromatic rings may be linked together via a single bond, an oxygen atom, an alkylene group, or an alkenylene group.

The triphenylamine compounds may be described using Structure (I) below.

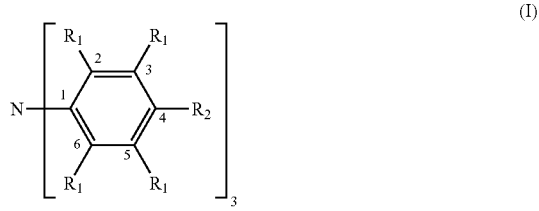

In Structure (I) each $R_1$ may be independently H, F, Cl, Br, haloalkyl, alkyl, alkoxy, or dialkylamido. $R_2$ may be independently H, F, Cl, Br, alkyl, or haloalkyl. When $R_2$ is alkyl, the alkyl group may have between 1 and 4 carbon atoms. More specifically $R_2$ may be methyl, ethyl, propyl, isopropyl, butyl, isobutyl or tert-butyl. A triphenylamine of Structure (I) in which at least one of the $R_1$ or $R_2$ groups is not H is considered a substituted triphenylamine. The haloalkyl groups may contain, for example, 1 to about 4 carbon atoms, and may include perhaloalkyl groups. The substitution in the aromatic rings may be in the 2, 4, and/or 6 positions and may in be in one ring, two rings, or all three rings. For example, $R_1$ and $R_2$ may be F or one or more trifluoroalkyl groups. In another example, $R_1$ or $R_2$ may be Br or one or more tribromoalkyl groups. These may be in the 2, 4, or 6-position of one ring, two rings or even all three rings with all of the other $R_1$ or $R_2$ groups bearing H. Or one ring may contain one, two or three F or trifluoroalkyl groups with the other two rings containing only H. Triphenylamines with mixed halo or haloalkyl substitutents may also be part of this invention. All other combinations of H, F, Cl, Br, haloalkyl, alkyl, alkoxy, or dialkylamido are possible on each aromatic ring, although the ease of synthesis may be dependent upon the availability of the required aromatic starting materials. Although not intended to be limiting, alkyl, alkoxy, and dialkylamido substituents, when present, are generally in the 4-position of the aromatic ring.

Some of the triphenylamine compounds are commercially available. Others may be available by previously disclosed synthetic routes. Triarylamine compounds useful in this invention may be made, for instance, by the Ullmann coupling of aniline or diphenylamine derivatives with one or two equivalents of halobenzene compounds (see, for instance, Walter, *J. Am. Chem. Soc.*, Vol. 77, 5999 (1955) and Schmidt, et al., *Chem. Berichte*, Vol. 113, 577 (1980)). Nucleophilic displacement reactions involving hexafluorobenzene and aniline nucleophiles have also produced triphenylamines useful in this invention (see Burdon, et al., *J. Chem. Soc.*, 5017 (1964)). Other triphenylamines may be available by amination of polyfluoroaromatic compounds with hexamethyldisilazane (see Miller, et al., *J. Fluorine Chem.*, Vol 75, 169 (1975)). Still other triphenylamines may be made by halogenation of triphenylamine (see, for example, Dapperheld, et al., *Chem. Berichte*, Vol. 124, 2557 (1991)).

Table II lists a number of triphenylamine compounds along with their oxidation potentials, reduction potentials, ethyl radical binding energies, $E_b(ER)$, of an oxidized shuttle molecule in a model reaction with an ethyl radical, ER, and molecular weights. The oxidation potentials (in volts) were either determined experimentally $E_{obs}$ (V) or were calculated $E_{calc}$ (V) using GAUSSIAN 03 software (available from Gaussian, Inc., Wallingford, Conn.) using the published method of Wang and Dahn, (*J. Electrochem. Soc.*, Vol. 153 (2), A445, 2006). The reduction potentials $E_{red, calc}$ (V) were also calculated the same way.

Binding energy, $E_b(ER)$, was arranged to estimate the relative reactivity of an oxidized shuttle molecule, which relates to the stability of a shuttle molecule in an electrochemical cell. For neutral shuttle molecules, S, such as the entries in Tables I and II, their oxidized forms, $S^+$, are more reactive and determine the stability of the shuttle in an electrochemical cell. The energetics of the model reaction of the oxidized shuttle molecule, $S^+$, with an ethyl radical (ER):

$$ER + S^+ \rightarrow ER\text{-}S^+ \tag{1}$$

is calculated using the GAUSSIAN 03 computational package based on the Becke three parameter hybrid functions, (see A. D. Becke, *J. Chem. Phys.*, Vol. 98, 5648 (1993)). and the Lee-Yang-Parr functional for electron correlation (see C. Lee, et al., *Phys. Rev. B.*, Vol 37, 785 (1988)). The basis set used was 6-31G(d, p), which is well known in electronic structure theory. The total electronic energy, $E_{el}(ER\text{-}S^+)$, of the product ER-$S^+$ of the model reaction may have a number of local minima, corresponding to the ER forming bonds with the different atoms of the oxidized shuttle molecule. The strongest interaction between the oxidized shuttle molecule and the ER corresponds to the product configuration, for which the total electronic energy reaches its global minimum, $\min\{E_{el}(ER\text{-}S^+)\}$. The binding energy $E_b(ER)$ of $S^+$ with ER is defined here to be the following:

$$E_b(ER) = E_{el}(S^+) + E_{el}(ER) - \min\{E_{el}(ER\text{-}S^+)\}. \tag{2}$$

Because both ER and $S^+$ are radicals with open electronic structure, they should bond when forming the closed ER-$S^+$ structure, when they are close to each other. Therefore the total electronic energy, $\min\{E_{el}(ER\text{-}S^+)\}$, of the combined system, ER-$S^+$, should be lower than the total energy of the separated radicals, ER and $S^+$, which is equal to the sum of the first and second terms in equation (2), $E_{el}(S^+) + E_{el}(ER)$. This means that the binding energy defined by equation (2) is positive. The larger the $E_b(ER)$, the higher the reactivity of the oxidized shuttle molecule and the less stable that molecule will be in an electrochemical cell.

The calculated binding energies, $E_b(ER)$, for a number of oxidized shuttle molecules with (ER) were compared with the measured stability of the shuttle molecules in coin-cell experiments using graphite or $Li_{4/3}Ti_{5/3}O_4$ as the negative electrode and $LiFePO_4$ as the positive electrode material. The cycling stability and the details of the experimental method are described by Buhrmester, et al., *J. Electrochem. Soc.*, Vol 152, A290, 2005 which is incorporated herein by reference. The stability of the shuttle is taken here to be the number of 100% overcharge cycles sustained by the shuttle before the shuttle action ceased.

In Table I, nineteen selected model shuttle molecules are listed with their calculated $E_b(ER)$, their measured stability, and their measured oxidation potential (E) versus Li/Li$^+$. For several shuttle molecules, two or three oxidation potentials, apparently corresponding to one, two and three electron oxidation, were measured and all of those are listed in Table I.

TABLE I

Model Shuttle Materials and Properties

| No. | Chemical Redox Shuttle | Structure | $E_b$(ER) (eV) | Cycles sustained | E (V) |
|---|---|---|---|---|---|
| 1 | 2,5-ditert-butyl-1,4-dimethoxybenzene | | 1.44 | >300 | 3.92 |
| 2 | 3-chloro-10-ethyl-phenothiazine (3-chloroEPT) | | 1.66 | >100 | 3.53 |
| 3 | 10-methyl-phenothiazine | | 1.731 | >100 | 3.47 |
| 4 | 3-chloro-10-cyanoethyl-phenothiazine | | 1.732 | 1 | 3.71 4.42 |
| 5 | Hexamethyl-benzene | | 1.91 | 7 | 4.2 |
| 6 | 2-bromo-4-fluoro-anisole | | 1.94 | 1 | 4.7 |
| 7 | 1,4-dimethoxybenzene | | 1.94 | 1 | 3.9 4.1 |
| 8 | 4-fluoro-1,2-dimethoxybenzene | | 1.95 | 18 | 4.1 |
| 9 | 2,4,6-Tri-bromo-anisole | | 1.95 | 1 | 4.9 |
| 10 | Thianthrene | | 1.95 | 2 | 4.0 |

TABLE I-continued

Model Shuttle Materials and Properties

| No. | Chemical Redox Shuttle | Structure | $E_b(ER)$ (eV) | Cycles sustained | E (V) |
|---|---|---|---|---|---|
| 11 | 1,3,5-tert-butyl-2-methoxy-benzene | | 2.02 | 3 | 4.4 |
| 12 | 4-bromo-anisole | | 2.11 | 1 | 4.4 |
| 13 | 9-methylcarbazole | | 2.15 | 1 | 3.78<br>4.06<br>4.47 |
| 14 | 10-ethylphenothiazine-5,5-dioxide (a) | | 2.26 | 5 | 4.18 |
| 15 | Anisole | | 2.39 | 33 | 4.2 |
| 16 | Benzene | | 2.79 | 2 | 4.8 |
| 17 | 10-ethyl-3-nitrophenothiazine-5-oxide (b) | | 2.92 | 1 | 4.21<br>4.42<br>4.56 |
| 18 | 2,2,6,6-tetramethyl-cyclohexanone | | 3.04 | 2 | 4.75 |
| 19 | Pyridine-N-oxide | | 3.69 | 1 | 4.30 |

(a) the shuttle calculated is 10-Methylphenothiazine-5,5-dioxide;
(b) the shuttle calculated is 10-Methylphenothiazine-5-oxide.

The calculated binding energy, $E_b(ER)$, between each oxidized model shuttle molecule and an ethyl radical, ER, is shown in Table I. The binding energy, $E_b(ER)$, can be used to estimate the stability of a shuttle molecule in an electrochemical cell; the larger the $E_b(ER)$, the less stable that molecule should be in an electrochemical cell. The data in Table I suggest that the best shuttles have an $E_b(ER)$ less than about 1.8 eV.

The oxidation and reduction potentials of the triphenylamine compounds determine their range of utility as chemical redox shuttles with positive or negative electrodes. As previously discussed, it is important that the oxidation potential of the chemical shuttle be slightly higher that the recharged potential of the positive electrode. The reduction potential of the chemical shuttle should be lower than the chemical potential of the negative electrode in its most lithiated state (i.e., the recharge potential of the negative electrode) to ensure that the neutral shuttle is not reduced under normal cell cycling or overcharge conditions. The calculated $E_b(ER)$ values of a number of triphenylamine compounds are reported in Table II along with redox potentials. The low values of $E_b(ER)$ (below about 1.8 eV) suggest that these molecules probably have stability in their oxidized form and should potentially be useful chemical redox shuttles in lithium batteries with electrodes compatible with their oxidation and reduction potentials as discussed above.

while have been oxidized while the first shuttle material was operative) could take over and provide a further (albeit higher $E_{cv}$) margin of safety against overcharge damage.

The shuttle material can also provide overdischarge protection to a cell or to a battery of series-connected cells, as described further in U.S. Patent Application Publication No. US2005/0221168-A1), the disclosure of which is incorporated herein by reference.

The triphenylamine compound is dissolved or dissolvable in the electrolyte in an amount sufficient to provide overcharge protection at the intended charging rate. According to the literature (Richardson, et al., *J. Electrochem. Soc.* Vol. 143, 3992 (1996)) the maximum shuttle current for a singly ionized shuttle is given by:

$$I_{max} = FADC/d, \qquad (3)$$

where F is Faraday's number, A is the electrode area, D is an effective diffusion constant of the shuttle species (taking into account both oxidized and reduced forms of the shuttle), C is the total concentration of the shuttle species and d is the distance between the electrodes. To obtain a large shuttle

TABLE II

Shuttle Compounds, Redox Potentials, and Ethyl Radical Binding Energies

| No. | Formula | MW | Chemical Name | $E_{calc}$ (V) | $E_{obs}$ (V) | $E_{red,calc}$ (V) | $E_b(ER)$ (eV) |
|---|---|---|---|---|---|---|---|
| 1 | $N(C_6H_5)_3$ | 245 | Triphenylamine | 3.48 | 3.67 | | 1.46 |
| 2 | $N(C_6H_4F)_3$ | 299 | Tris(4-fluorophenyl)amine | 3.56 | | −0.04 | |
| 3 | $N(C_6H_4Br)_3$ | 482 | Tris(4-bromophenyl)amine | 3.73 | 3.86 | 0.01 | 1.34 |
| 4 | $N(C_6H_4CF_3)_3$ | 449 | Tris(4-trifluoromethylphenyl)amine | 3.99 | | 0.14 | 1.42 |
| 5 | $N(C_6H_2FBrF)_3$ | 590 | Tris(2,6-difluoro-4-bromophenyl)amine | 4.25 | | 0.13 | 1.43 |
| 6 | $N(C_6H_2F_3)_3$ | 407 | Tris(2,4,6-trifluorophenyl)amine | 4.31 | | −0.16 | 1.14 |
| 7 | $N(C_6F_4CH_3)_3$ | 503 | Tris(4-methyl-2,3,5,6-tetrafluorophenyl)amine | 4.51 | | 0.16 | 1.44 |
| 8 | $N(C_6H_2Br_3)_3$ | 956 | Tris(2,4,6-tribromophenyl)amine | 4.53 | | 0.48 | 1.59 |
| 9 | $N(C_6H_2Cl_3)_3$ | 555 | Tris(2,4,6-trichlorophenyl)amine | 4.54 | | 0.25 | 1.22 |
| 10 | $N(C_6F_4H)_3$ | 461 | Tris(2,3,5,6-tetrafluorophenyl)amine | 4.71 | | 0.39 | 1.87 |
| 11 | $N(C_6F_5)_3$ | 515 | Tris(2,3,4,5,6-pentafluorophenyl)amine | 4.74 | | 0.44 | 1.58 |
| 12 | $N(C_6F_4CF_3)_3$ | 665 | Tris(4-trifluoromethyl-2,3,5,6-tetrafluorophenyl)amine | 5.29 | | 1.06 | 1.83 |

Other exemplary triphenylamine compounds include, but are not limited to, tris(2,4-difluorophenyl)amine, (bis(4-fluorophenyl)2,4-difluorophenyl)amine, (bis(2,4-difluorophenyl)4-fluorophenyl)amine, tris(2,4-dichlorophenyl)amine, (bis(4-chlorophenyl)2,4-dichlorophenyl)amine, (bis(2,4-dichlorophenyl)4-chlorophenyl)amine, tris(2,4-dibromophenyl)amine, (bis(4-bromophenyl)2,4-dibromophenyl)amine, (bis(2,4-dibromophenyl)4-bromophenyl)amine, tris(4-methoxy-2,3,5,6-tetrafluorophenyl)amine, tris(4-dimethylamido-2,3,5,6-tetrafluorophenyl)amine, and the like.

Mixtures of two or more shuttle materials having different electrochemical potentials vs. Li/Li$^+$ may also be employed. For example, a first shuttle material operative at 3.7V and a second shuttle material operative at 3.9V may both be employed in a single cell. If after many charge/discharge cycles the first shuttle material degrades and loses its effectiveness, the second shuttle material (which would not meancurrent, the electrolyte should impart a large diffusion constant D to the shuttle and support a high shuttle concentration C. Thus the electrolyte desirably initially or eventually contains an ample dissolved quantity of suitably mobile triphenylamine compound. The shuttle diffusion constant D usually will increase as the electrolyte solution viscosity decreases. Exemplary concentrations of the triphenylamine compound in the electrolyte are about 0.05 M up to the limit of solubility, more than 0.1 M up to the limit of solubility, about 0.2 M up to the limit of solubility or about 0.3 M up to the limit of solubility. The triphenylamine compound concentration may, in some instances, be increased by incorporating a suitable cosolvent in the electrolyte. Exemplary cosolvents include acetonitrile, benzene, ethers (e.g., dimethoxyethane), esters (e.g., ethyl acetate or methyl acetate), lactones (e.g., gamma-butyrolactone), pyridine, tetrahydrofuran, toluene and combinations thereof.

The disclosed lithium-ion cells may include a porous cell separator located between the positive and negative electrodes and through which charge-carrying species (including the oxidized or reduced shuttle compound) may pass. Suitable separators will be familiar to those skilled in the art. The disclosed cells may be sealed in a suitable case, e.g., in mating cylindrical metal shells such as in a coin-type cell, in an elongated cylindrical AAA, AA, C, or D cell casing or in a replaceable battery pack as will be familiar to those skilled in the art. The disclosed cells may be used in a variety of devices, including portable computers, tablet displays, personal digital assistants, mobile telephones, motorized devices (e.g, personal or household appliances and vehicles), instruments, illumination devices (e.g., flashlights), and heating devices. The disclosed cells may have particular utility in low-cost mass market electrical and electronic devices such as flashlights, radios, MP3 and CD players, and the like, which heretofore have usually been powered by non-rechargeable batteries such as alkaline cells. Further details regarding the construction and use of rechargeable lithium-ion cells will be familiar to those skilled in the art.

The invention is further illustrated in the following non-limiting illustrative examples, in which all parts and percentages are by weight unless otherwise indicated.

EXAMPLES

Examples 1 and 2

Negative electrodes were made from $Li_{4/3}Ti_{5/3}O_4$ (synthesized according to the procedure shown in K. M. Colbow, R. R. Haering, and J. R. Dahn, "Structure and Electrochemistry of the Spinel Oxides $LiTi_2O_4$ and $Li_{4/3}Ti_{5/3}O_4$", J. Power Sources, 26, 397-402 (1989)) using the following procedure. 100 parts of the negative electrode active material (viz., $Li_{4/3}Ti_{5/3}O_4$), 5 parts KYNAR 301P polyvinylidene fluoride (from Atofina Chemicals, Philadelphia, Pa.) and 5 parts SUPER S™ Carbon Black (from MMM Carbon, Tertre, Belgium) were mixed with N-methylpyrrolidinone to form a slurry. After thorough mixing in a polyethylene bottle containing spheres of ZIRCOA 6.35 mm diameter zirconium oxide banded satellite spherical media (from Zircoa, Inc., Solon, Ohio), the slurry was coated in a thin film on a copper foil current collector. The resulting coated electrode foil was dried in air overnight at 90° C. Individual 1.3 cm diameter electrode discs were cut from the electrode foil using a precision punch. Positive electrodes were made the same way using $LiFePO_4$ (from Phostech Lithium, Ste-Foy, Quebec, Canada) as the active material and aluminum foil as the current collector.

Electrolytes were prepared by dissolving the appropriate amount of the lithium salt indicated in Table III (below) in a charge-carrying medium of propylene carbonate ("PC"), dimethyl carbonate ("DMC"), ethylene carbonate ("EC") and diethyl carbonate ("DEC") in volume ratio of 1:2:1:2 PC/DMC/ED/DEC to form an electrolyte solution with the correct concentration of salt. An amount of the indicated chemical redox shuttle indicated in Table III was then added to the electrolyte solution to reach the described concentration. Triphenylamine shuttle materials were obtained from Sigma-Aldrich Co. (Milwaukee, Wis.). Lithium bis(oxalo) borate ("LiBOB") was obtained from Chemetall Group of Dynamit Nobel AG, Troisdorf, Germany, and $LiPF_6$ was obtained from Stella Chemifa Corp., Japan.

Coin-type test cells were built using 2325 coin cell hardware (from Kaga USA, Inc., Santa Ana, Calif.) as described in A. M. Wilson and J. R. Dahn, J. Electrochem. Soc., 142, 326-332 (1995). An exploded perspective schematic view of a 2325 coin cell 10 is shown in FIG. 1. Stainless steel cap 24 and oxidation resistant case 26 enclosed the cell and served as the negative and positive terminals respectively. The negative electrode 14 was formed from $Li_{4/3}Ti_{5/3}O_4$ coated on copper foil current collector 18 as described above. The positive electrode 12 was formed from $LiFePO_4$ coated on aluminum foil current collector 16 as described above. Separator 20 was formed from CELGARD™ No. 2500 microporous material (from Celgard, LLC, Charlotte, N.C.) having a 25 micrometer thickness, and wetted with the electrolyte containing the chemical redox shuttle material. For some cells (noted below), the cell was prepared using two separators placed back-to-back. Gasket 27 provided a seal and separated the two terminals. A tightly squeezed stack was formed when the cell was crimped closed.

The assembled cells were cycled at 30° C. using "C/20" (20 hour charge and 20 hour discharge), "C/10" (10 hour charge and 10 hour discharge), and "C/5" (5 hour charge and 5 hour discharge) rates using a computer-controlled charge-discharge testing unit produced by E-One/Moli Energy Canada. The negative ($Li_{4/3}Ti_{5/3}O_4$) electrodes had a specific capacity of about 140 mAh/g. The negative electrode capacity was selected to be about 130% of the positive electrode capacity to ensure that during charging followed by overcharging, the positive electrode would be depleted of lithium (and hence reach and pass $E_{cv}$) while the negative electrode remains at its plateau potential of 1.55 V vs. Li/Li⁺. A 140 mA/g specific current could discharge a fully charged cell containing such electrodes in one hour, and would represent a "1C" rate for such cells. These cells were discharged to 1.0 or 1.3 V and were charged to a fixed capacity or until an upper cutoff of 3.40 V was reached. Since $Li_{4/3}Ti_{5/3}O_4$ has a recharged potential near 1.55 V vs. Li/Li⁺, the 1.0, 1.3 and 2.65 V cell potentials correspond to potentials of about 2.55, 2.85, and 4.95 V vs. Li/Li⁺.

Examples 3 and 4

Cells and electrolytes were constructed, tested and formulated as in Examples 1 and 2 except that 0.05 M tris(4-bromophenyl)amine was used in place of the triphenylamine. The cells were cycled at C/10 and C/5.

The shuttle test cell cycling results for Examples 1-4 are shown below in Table III.

TABLE III

Coin Cell Materials and Cycling Performance

| Ex. | Shuttle | Shuttle Concentration | Electrolyte Salt Concentration | Charge/Discharge Rate | Cycles |
|---|---|---|---|---|---|
| 1 | Triphenylamine | 0.7 M | 0.5M LiBOB | C/20 | 7 |
| 2 | Triphenylamine | 0.7 M | 0.5M LiBOB | C/10 | 5 |
| 3 | Tris(4-bromophenyl)amine | 0.05 M | 0.5M LiBOB | C/10 | 41 |
| 4 | Tris(4-bromophenyl)amine | 0.05 M | 0.5M $LiPF_6$ | C/5 | 25 |

The results in Table III show that the selected triphenylamine compounds provided overcharge and overdischarge protection in rechargeable lithium-ion cells at several charge and discharge rates. In each run, overcharge and overdischarge protection was obtained without requiring separate control electronics.

A number of embodiments of the invention have been described. It will be understood that even in the numerous characteristics and advantages of the present invention set forth in above description and examples, together with details of the structure and function of the invention, the disclosure is illustrative only. Changes can be made to details within the principles of the invention to the full extent indicated by the meaning of the terms in which the appended claims are expressed and the equivalents of those structures and methods.

We claim:
1. A rechargeable lithium-ion cell comprising:
 (a) a positive electrode having a recharged potential;
 (b) a negative electrode;
 (c) a charge-carrying electrolyte comprising a charge carrying medium and a lithium salt; and
 (d) a cyclable redox chemical shuttle comprising a fluorine-containing triphenylamine compound;
 wherein the chemical shuttle is dissolved in the electrolyte and has an oxidation potential above the recharged potential of the positive electrode, and
wherein the triphenylamine compound is substituted with one or more halogen or trihaloalkyl substituents on at least two of the aromatic rings.
2. A cell according to claim 1 wherein the one or more halogen substituents are selected from fluoro, chloro, and bromo.
3. A cell according to claim 2 wherein each phenyl ring is substituted with an equal number of the same halogen.
4. A cell according to claim 1 wherein the negative electrode comprises graphitic carbon, lithium metal, or a lithium alloy compound.
5. A cell according to claim 1 wherein the cyclable redox chemical shuttle has the chemical formula:

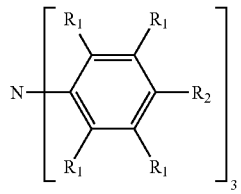

wherein each $R_1$ is independently H, F, Cl, Br or haloalkyl and each $R_2$ is independently H, F, Cl, Br, alkyl, or haloalkyl.
6. The cell of claim 5 wherein $R_1$ or $R_2$ independently comprise F or haloalkyl and wherein the haloalkyl is a trifluoroalkyl group.
7. A cell according to claim 1 wherein the triphenylamine compound comprises tris(4-fluorophenyl)amine, tris(4-trifluoromethylphenyl)amine, tris(2,4,6-trifluorophenyl)amine, tris(4-methyl-2,3,5,6-tetrafluorophenyl)amine, tris(2,3,5,6-tetrafluorophenyl)amine, tris(2,3,4,5,6-pentafluorophenyl)amine, tris(4-trifluoromethyl-2,3,5,6-tetrafluorophenyl)amine, tris(2,6-difluoro-4-bromophenyl)amine, or mixtures thereof.
8. A cell according to claim 1 wherein the chemical shuttle is comprised of the fluorine-containing triphenylamine compound and at least one compound selected from tris(4-bromophenyl)amine, tris(4-fluorophenyl)amine, tris(4-trifluoromethylphenyl)amine, tris(2,4,6-trifluorophenyl)amine, tris(4-methyl-2,3,5,6-tetrafluorophenyl)amine, tris(2,3,5,6-tetrafluorophenyl)amine, tris(2,3,4,5,6-pentafluorophenyl)amine, tris(4-trifluoromethyl-2,3,5,6-tetrafluorophenyl)amine, tris(2,6-difluoro-4-bromophenyl)amine, tris(2,4,6-tribromophenyl)amine, tris(2,4,6-trichlorophenyl)amine, or a mixture thereof.
9. The cell of claim 1 wherein the charge carrying medium comprises a cosolvent.
10. A cell according to claim 9 wherein the cosolvent comprises ethylene carbonate, propylene carbonate, dimethyl carbonate, diethyl carbonate, ethylmethyl carbonate, fluoroethylene carbonate, vinylene carbonate, vinylethylene carbonate, or a combination thereof.
11. A cell according to claim 1 wherein the triphenylamine compound has an oxidation potential from about 0.1 V to about 2.0 V above the recharged potential of the positive electrode.
12. A cell according to claim 1 wherein the triphenylamine compound has an oxidation potential from about 0.3 to about 0.6 V above the recharged potential of the positive electrode.
13. A cell according to claim 1 wherein the triphenylamine compound provides overcharge protection after at least 25 charge-discharge cycles at a charging voltage sufficient to oxidize the triphenylamine compound and at an overcharge charge flow equivalent to 100% of the cell capacity during each cycle.
14. A cell according to claim 1 wherein the triphenylamine compound provides overcharge protection after at least 40 charge-discharge cycles at a charging voltage sufficient to oxidize the triphenylamine compound and at an overcharge charge flow equivalent to 100% of the cell capacity during each cycle.
15. A cell according to claim 1 wherein the triphenylamine compound has a calculated binding energy to an ethyl radical, $E_b(ER)$, of less than or equal to 1.8 eV.
16. A rechargeable lithium-ion cell comprising:
 (a) a positive electrode having a recharged potential;
 (b) a negative electrode comprising graphitic carbon, lithium metal, or a lithium alloy compound; and
 (c) a charge-carrying electrolyte comprising:
  (i) a charge-carrying media comprising ethylene carbonate, propylene carbonate, dimethyl carbonate, diethyl carbonate, ethylmethyl carbonate, fluoroethylene carbonate, vinylene carbonate, vinylethylene carbonate, or a combination thereof;
  (ii) a lithium salt comprising $LiPF_6$, lithium bis(oxalato) borate, $LiN(SO_2CF_3)_2$, $LiN(SO_2C_2F_5)_2$, $LiC(SO_2CF_3)_3$, or a combination thereof; and
  (iii) a cyclable redox chemical shuttle comprising a fluorine-containing triphenylamine compound;
 wherein the positive electrode comprises $LiFePO_4$, $Li_2FeSiO_4$, $LiMn_2O_4$, $LiMnPO_4$, $Li_xMnO_2$ (where x is about 0.3 to about 0.4), $MnO_2$, $LiVOPO_4$, $Li_3V_2(PO_4)_3$, $LiV_3O_8$, or $LiVO(PO_4)F$;
 wherein the triphenylamine compound is substituted with one or more halogen or trihaloalkyl substituents on at least two of the aromatic rings; and
 wherein the chemical shuttle is dissolved in the electrolyte and has an oxidation potential above the recharged potential of the positive electrode.
17. A cell according to claim 16 wherein the triphenylamine compound comprises, tris(4-fluorophenyl)amine, tris(4-trifluoromethylphenyl)amine, tris(2,4,6-trifluorophenyl)amine, tris(4-methyl-2,3,5,6-tetrafluorophenyl)amine, tris(2,3,5,6-tetrafluorophenyl)amine, tris(2,3,4,5,6-pentafluorophenyl)amine, tris(4-trifluoromethyl-2,3,5,6-tetrafluorophenyl)amine, tris(2,6-difluoro-4-bromophenyl)amine, or mixtures thereof.

* * * * *

UNITED STATES PATENT AND TRADEMARK OFFICE
CERTIFICATE OF CORRECTION

| | | |
|---|---|---|
| PATENT NO. | : 7,585,590 B2 | |
| APPLICATION NO. | : 11/671128 | |
| DATED | : September 8, 2009 | |
| INVENTOR(S) | : Richard Wang | |

It is certified that error appears in the above-identified patent and that said Letters Patent is hereby corrected as shown below:

<u>Column 2,</u>
Line 6, delete "thereof, and" and insert --thereof; and-- therefor.

<u>Column 5,</u>
Line 9, delete "Cow.);" and insert --Corp.);-- therefor.

Signed and Sealed this
Twenty-sixth Day of July, 2011

David J. Kappos
*Director of the United States Patent and Trademark Office*